United States Patent [19]

Krawza et al.

[11] 4,331,975
[45] May 25, 1982

[54] INSTRUMENTATION FOR SURVEYING UNDERGROUND CAVITIES

[75] Inventors: Walter G. Krawza, Lakeville; George A. Savanick, Apple Valley, both of Minn.

[73] Assignee: The United States of America as represented by the Secretary of the Interior, Washington, D.C.

[21] Appl. No.: 195,539

[22] Filed: Oct. 9, 1980

[51] Int. Cl.³ .............................................. H04N 7/18
[52] U.S. Cl. ........................................ 358/100; 356/1
[58] Field of Search .................... 358/100, 107; 356/1, 356/4

[56] References Cited

U.S. PATENT DOCUMENTS

| | | | |
|---|---|---|---|
| 3,620,625 | 11/1977 | Tegholm | 356/1 |
| 4,063,283 | 12/1977 | Rider et al. | 356/1 |
| 4,180,322 | 12/1979 | Farcinade | 356/1 |

*Primary Examiner*—Joseph A. Orsino, Jr.
*Assistant Examiner*—Edward L. Coles
*Attorney, Agent, or Firm*—Thomas Zack; Donald A. Gardiner

[57] ABSTRACT

Instrumentation that can be lowered into an underground cavity to measure the dimensions of the cavity and also, as an added option, the ability to take photographs of the area of interest. The basic structure making up the preferred embodiment has a mounting frame with a television camera, a light beam assembly having two separate aligned light sources, and a mechanism to raise/lower the frame and also to tilt the light beam assembly. Above the ground is an appropriate readout unit which relates the angle of tilt for one of the light beam sources to a value of an electrical signal. To determine the distance from the aligned light source to the cavity surface, the light beams are superimposed upon one another to form a spot on the surface whose distance from the sources is to be measured. This spot is observed on the television camera and the signal magnitude (voltage) corresponding to the angle of tilt of the light source noted. By keeping the other light source rigid relative to the frame and knowing the fixed distance between the two light sources and the angle of tilt, it is possible by simple trigonometry to determine the distance in question. If visual detail greater than that observable with a television camera is desired, a re-ered flash camera may also be attached to photograph the surface under observation.

3 Drawing Figures

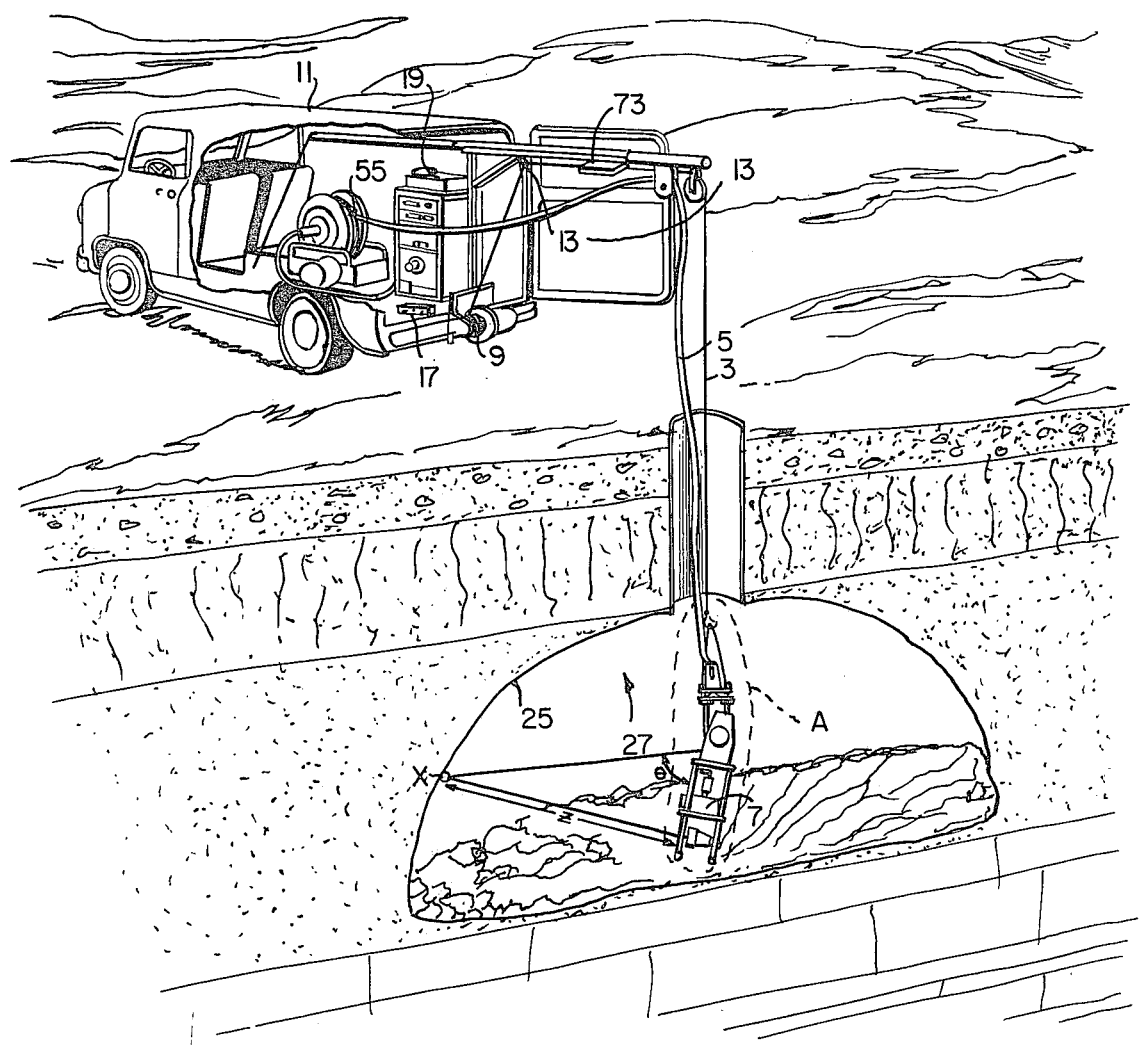

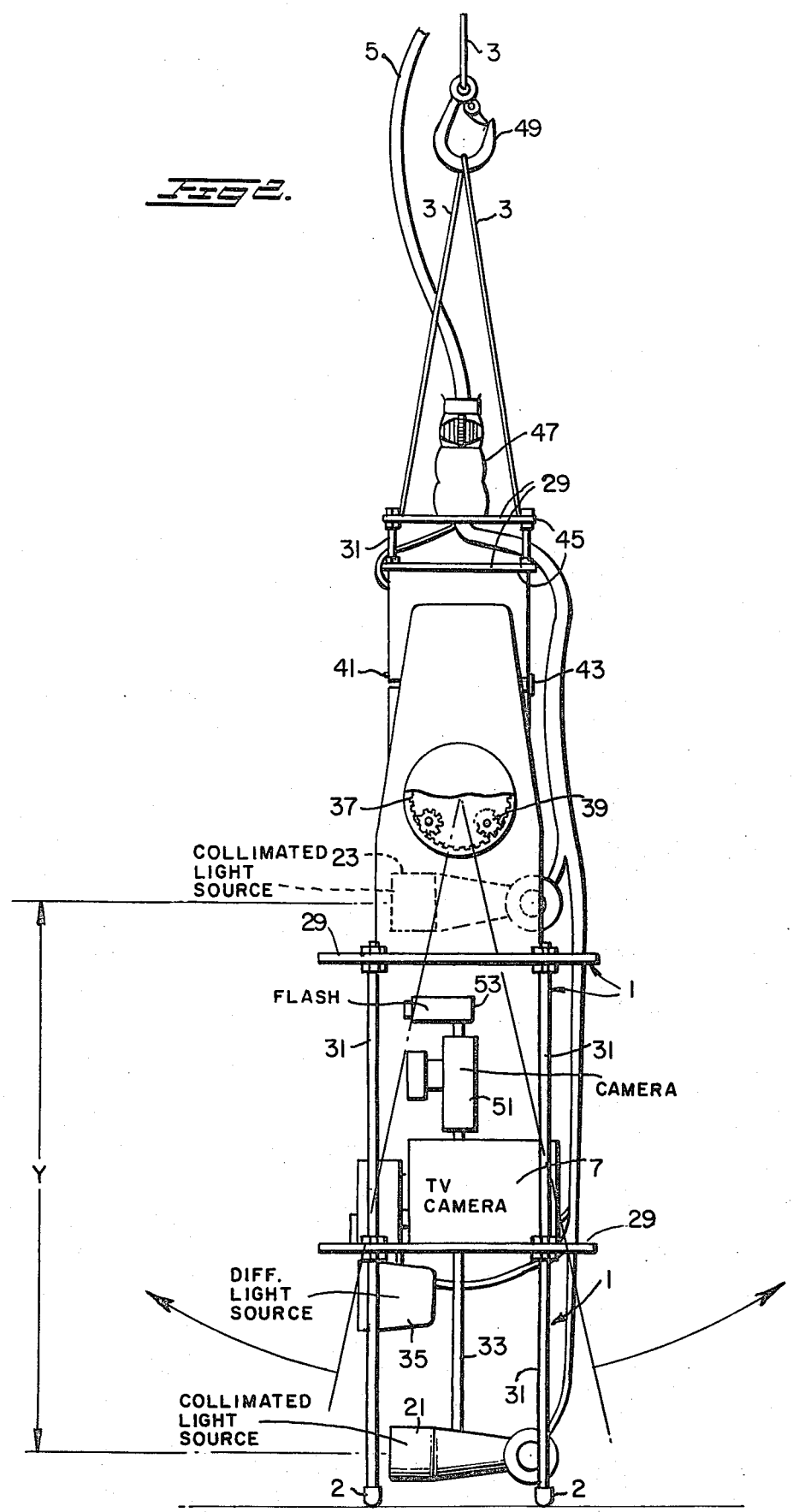

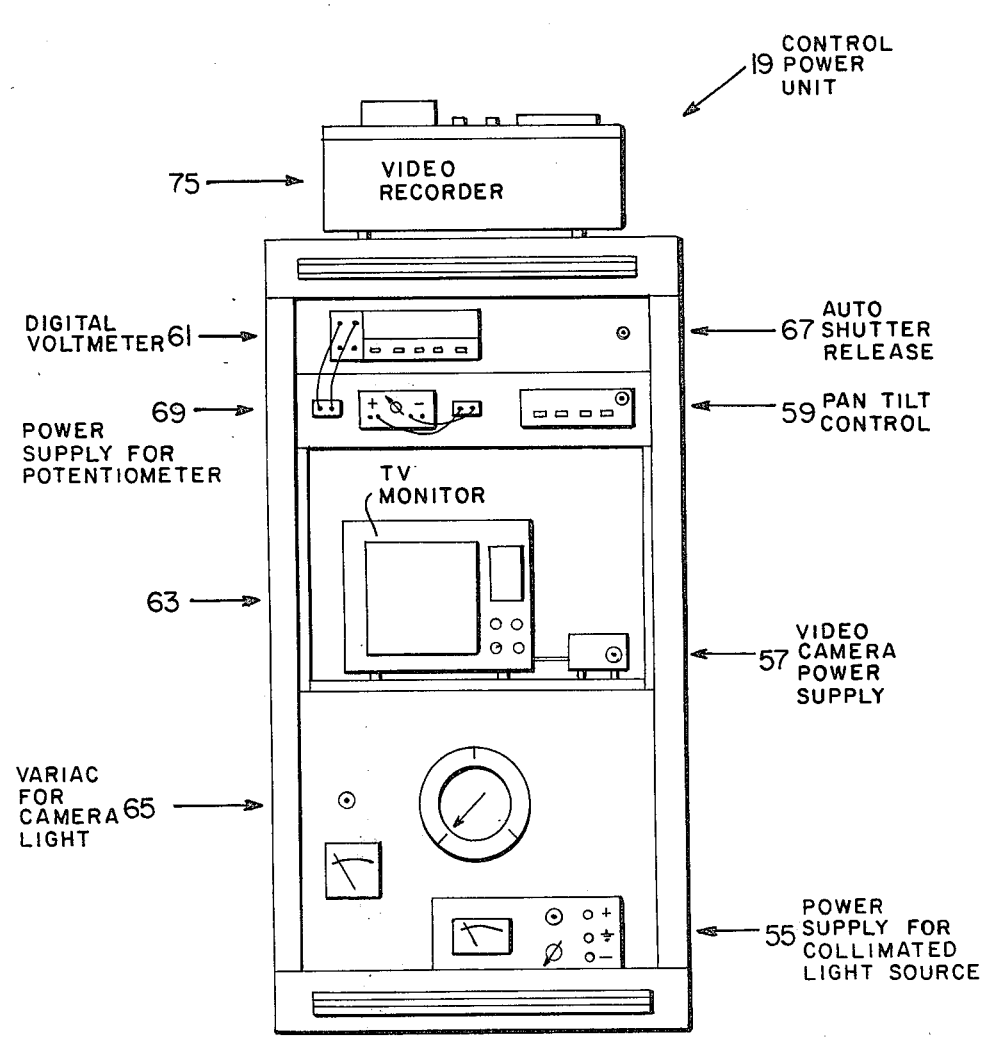

INSTRUMENTATION FOR SURVEYING UNDERGROUND CAVITIES

BACKGROUND OF THE INVENTION

1. Field of the Invention

This disclosed invention relates to those instruments specifically designed and constructed to fit through small openings and remotely measure distances in cavities remote therefrom.

2. Description of the Prior Art

Many types of cavities, like underground mines and caves, are not readily accessible to humans. Our invention is directed to remotely measuring dimensions in these types of cavities without humans actually being in the cavity. Many types of devices are known which measure distances without physically employing a solid measuring device placed between the end points whose distances therebetween is desired to be determined. Some of these systems employ reflected waves, like laser, radar, or sound waves, and determine the distance under observation by noting the time interval it takes the wave to travel both ways and multiplying it by the known velocity of the particular wave used. Because of the inaccuracies that would be caused by the readings from the received reflected waves, we do not employ this principle to measure distance. However, the U.S. Pat. Nos. 3,180,205 (Hepper), 3,848,999 (Dall'Armi), and 3,620,625 (Tegholm) disclose systems which in someway or another do employ this principle.

Television cameras have been employed in systems used to measure distances. One example is found in U.S. Pat. No. 4,063,283 (Rider et al) wherein digitized signals from a television camera are processed by a computer which collects reflected laser beams (col. 2, lines 43 et seq.).

Our invention is different from all of these systems in that it is used to measure distances in underground cavities through a borehole in the earth; it does not employ reflected waves to determine the distance; it does use two spaced light beams that are superimposed on a common object, a television camera, and the principles of trigonometry to arrive at the distances to be determined. Since the television camera and intersecting light beam may be selectively oriented to face in almost any direction in the cavity, many distance measurements can be made within the cavity to profile a complex surface therein. None of the known prior art employs such a system to reveal the detail surface configuration under investigation rather than the average distances obtained from reflected pulses of energy.

SUMMARY OF THE INVENTION

The distance measuring system disclosed herein employs a television camera, a light beam assembly with two aligned spaced light sources, a mounting frame, and a control system for both moving the system up and down and for tilting at least one of the two light sources. In order to measure the distance from the center of the aligned sources in the borehole into which the frame is lowered and the spot at which the two light beams intercept on the cavities' surface, the spot is first viewed by the television camera. Next, the angle of tilt of one of the light beams corresponding to an electrical signal reading relative to the frame is determined. Since the other light source is fixed relative to the frame and the tiltable light source, it is possible to determine the spot's distance by simple trigonometry principles.

The primary object of this invention is an improved distance measuring system especially designed to be used in underground cavities.

DESCRIPTION OF THE DRAWINGS

FIG. 1 is a simplified illustration of how the preferred embodiment of the invention could be used in an underground cavity.

FIG. 2 shows the preferred embodiment of the invention—encircled by dashed line A in FIG. 1—in greater detail.

FIG. 3 illustrates the control/power assembly.

DESCRIPTION OF THE PREFERRED EMBODIMENT

The basic components of the preferred embodiment are shown in FIG. 1 as being mounted on the metal support frame assembly 1 which is vertically supported by cable 3. Protecting rubber caps 2 are located on the four ground engaging feet of the frame. This cable is envisioned as being wound around a power driven winch 9 attached to surface vehicle 11. This vehicle is shown as a van with a panel section cut away to reveal its contained parts. Appropriate conventional support pulleys 13 allow the frame and its attachments to be raised and lowered in the borehole 15 when the control unit 17 is activated. Also extending into this borehole is the cable 5 which is attached to and operates the television camera 7 rigidly fixed to the support frame. Located within the vehicle is the power/control unit 19 which provides a multitude of functions as hereinafter set forth.

Attached to the mounting frame are two spaced vertically aligned collimated or parallel light sources designated by the numbers 21 and 23. One of these sources (21) is tiltable with respect to the upper frame since the lower frame section to which it is fixed is tiltable with respect to its own upper frame portion. The other light source (23) is fixed to the upper portion of the frame so that it shines in a constant perpendicular direction with respect thereto. The distance between the two light sources is fixed. When these two light sources are both directed so that they form a spot X on the surface 25 forming the boundary of the underground cavity 27, it can be seen from FIG. 1 that a right angle triangle is formed by the two light beams and the fixed distance Y between the light sources. By knowing the angle $\theta$ between the tiltable source and the distancy Y, it is possible to determine by simple trigonometry the distance to the spot X on the cavities' surface. For example, if the angle $\theta$ were 60 degrees, then its tangent is Z/Y or the distance to be determined, Z is Y tangent 60° or Y (1.7321). It should be clear that as more distinct light spots $(X, X_1, X_2 \ldots X_n)$ are selectively investigated or the underground surface 25 to yield more distances $(Z, Z_1, Z_2 \ldots Z_n)$, the nature of the actual surface configuration which forms the boundary of the cavity becomes better known.

FIG. 2 shows the preferred embodiment of this invention in greater detail. The support frame is a series of four rigid spaced horizontal platforms 29 interconnected by rigid vertical pipe members 31. Four spaced pipe members connected each platform to its adjacent platform by nuts which bear down of the platform surfaces. Starting at the lowest portion of the frame, there is shown the tiltable light source 21 which is rigidly held on lower frame assembly at a right angle to this part of the frame by vertical support member 33. Attached to the lowermost platform is television camera 7 on its upper surface and light 35 to allow a diffused illumination for the camera without interfering with the spot formed by the two superimposed collimated light beams from the light sources 21 and 23. Above the television camera a still (35 mm) camera 51 with its flash 53 may be attached. This 35 mm camera allows higher resolution photographs to be taken than would normally be available from the television camera. Normally, the operator would be viewing the cavity with the television camera while in the vehicle and would, if a particular area was of interest, take a 35 mm photograph of the same by remotely triggering its operation from the surface.

The tiltable collimated light source 21 is mounted on the lower tiltable frame section and aligned with the upper identical light source 23 which is fixed at a right angle to the vertical by being fixed to the upper frame section. It is shown in invisible outline since it is on the far side of the tiltable frame section. As the source tilts, an electric voltage signal is generated which is a function of the tilt angle and this voltage level is read above ground and then correlated with the tilt angle. Normally a calibration curve is used to determine the unknown desired distance Z. As a possible alternative, it could, of course, be computed automatically and displayed on a readout by utilizing a small computer in the circuitry. Slightly above the fixed light source 23 is a gear 37 for a three turn potentiometer and a tilt drive gear 39 which is used to tilt the lower frame section. The angle of tilt for the lower frame support is limited by the limit switch 41 and the stop 43. Still further up, the two smaller upper upper platforms 45 support the cable 3 and the electric cable 7 which latter cable is joined to the unit by a multi-conductor plug-in type of connector 47. A snap lock hook 49 joins the single cable 3 to its two lower extensions to support the frame, etc.

As previously mentioned, the control power unit 19 (FIG. 3) performs and supplies a wide multitude of functions. It houses the electrical power supplies for the collimated light sources 55, the television camera 57, the winch 9, and the pan and tilt mechanism 59. It also houses a digital voltmeter 61, a television monitor 63, a variac for the camera light 65, an automatic shutter release 67 for the 35 mm camera, and a power supply for the potentiometer 69. Other conventional features shown in FIG. 1 include the reel 71 for the electric cable 5 and the depth indicator 73 which indicates the depth below ground for the unit attached to cable 3 and the video recorder 75.

In one working system employing the disclosed preferred embodiment: the television camera 7 used was a Sony video camera model AVC-1400 manufactured by the Sony Corporation of Japan; the still camera 35 was an Olympus 35 mm model OM-2 from the Olympus Optical Co. Ltd. of New York, and the two collimated light sources were two N-3C gunsight bench collimators distributed by the Edmund Scientific Co. of Barrington, N.J., each of which used the filament of a GE 1156 12 volt lamp. The tilt angle was displayed on the digital voltmeter 61 which was divided from a three turn potentiometer driven by the tilt drive gear. An accuracy of ±3 inches at 30 feet for the distance (Z) to be determined is possible. One type of tilt drive which has been used for the camera is that designated by number X77-0775 manufactured by Vicon Industries, Inc., of Plainview, N.Y.

The purpose of this invention is to measure the dimensions of an underground cavity from the surface by instrumentation lowered through a borehole or other aperture entrance normally too small for personnel to fit through. Many types of cavities, like abandoned mine works and caves, could be surveyed by this type of instrumentation. One type of mining method it would have particular applicability to is the method termed borehole mining. In this method, ore is removed remotely through a hole board from the surface to the ore zone. As the ore is removed, a cavity is formed which can be measured by this invention.

In one working embodiment of this invention, the equipment was constructed so that it fit through a borehole 12 inches in diameter. A still smaller embodiment capable of fitting through a six inch diameter borehole will shortly be ready. However, it is not the size of the instrument package which provides its best feature. It is the selectively of its use which allows an operator to use the television camera to measure distances to a selected cavity surface and, if desired, take a still photograph of the same. In this way the profile of an underground complex surface can be arrived at by measuring many spots on its surface.

Many uses and changes can be made utilizing the principles of our invention as disclosed herein. None of these changes or potential other uses should be used to limit the scope and extent of our invention which is to be measured only by the claims that follow.

We claim:

1. A system for surveying the surfaces forming underground cavities comprising:
   a rigid frame assembly for supporting instrumentation;
   means for raising and lowering said frame into an aperture which leads to the cavity whose defining surface is to be determined;
   a television camera mounted on said frame and capable of being fit through said aperture; said television camera being operatively connected to a remote monitor to allow viewing thereat of the cavity;
   a collimated light beam assembly mounted on the frame assembly, said beam assembly having two aligned sources of light beams spaced a known distance apart from each other and capable of projecting beams in the same direction;
   means for tilting one of said sources of light beams relative to the frame while the other source is held rigid with respect to the frame to thereby superimpose the two beams upon each other and form a spot on the cavity surface under observation; and
   means remote from said beam assembly to determine the angle of tilt of said tiltable light source whereby the distance from the two light sources to the spot form on the cavity's surface may be determined based on the angle of tilt and the known distance the sources are spaced apart.

2. The system of claim 1 also additionally comprising:
   a camera for taking high resolution still photographs mounted on the frame and moveable with the tiltable light source.

* * * * *